United States Patent
Araya

(10) Patent No.: US 10,404,888 B2
(45) Date of Patent: Sep. 3, 2019

(54) IMAGE FORMING SYSTEM, SERVER, AND IMAGE FORMING METHOD THAT PERFORM DEAD/ALIVE MONITORING OF AT LEAST PART OF SERVERS

(71) Applicant: KYOCERA Document Solutions Inc., Osaka (JP)

(72) Inventor: Takeshi Araya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/058,833

(22) Filed: Aug. 8, 2018

(65) Prior Publication Data
US 2019/0068826 A1    Feb. 28, 2019

(30) Foreign Application Priority Data
Aug. 30, 2017    (JP) .................................. 2017-165752

(51) Int. Cl.
- G06F 3/12      (2006.01)
- H04N 1/32      (2006.01)
- H04N 1/00      (2006.01)

(52) U.S. Cl.
CPC ..... H04N 1/32641 (2013.01); H04N 1/00344 (2013.01); H04N 1/32651 (2013.01)

(58) Field of Classification Search
CPC ........... H04N 1/32641; H04N 1/00344; H04N 1/32651
USPC .......................................... 358/1.1–1.18, 402
See application file for complete search history.

(56) References Cited

U.S. PATENT DOCUMENTS

| | | | | |
|---|---|---|---|---|
| 2008/0056160 | A1* | 3/2008 | Kamada | H04L 12/66 370/254 |
| 2013/0262670 | A1* | 10/2013 | Tamura | H04L 41/0631 709/224 |
| 2015/0006948 | A1* | 1/2015 | Yamabiraki | G06F 11/2028 714/4.11 |
| 2016/0065430 | A1* | 3/2016 | Hirahara | H04L 43/065 709/224 |

FOREIGN PATENT DOCUMENTS

JP    2013-186481 A    9/2013

* cited by examiner

*Primary Examiner* — Gabriel I Garcia
(74) *Attorney, Agent, or Firm* — Hawaii Patent Services; Nathaniel K. Fedde; Kenton N. Fedde

(57) ABSTRACT

Provided is an image forming system capable of dead/alive monitoring without adding a special apparatus.
An information-transmitting unit of an image forming apparatus transmits management information. A management-information-acquiring unit of a front-end server acquires the management information from the image forming apparatus. An analyzing unit of a back-end server analyzes the management information acquired by the management-information-acquiring unit. An interval-instructing unit of the front-end server, at specified time intervals accumulates instructions for the analyzing unit. The dead/alive-monitoring unit counts the number of messages not acquired by the analyzing unit, and when the number of messages is equal to or greater than a specified threshold value, determines the analyzing unit is not operating.

4 Claims, 7 Drawing Sheets

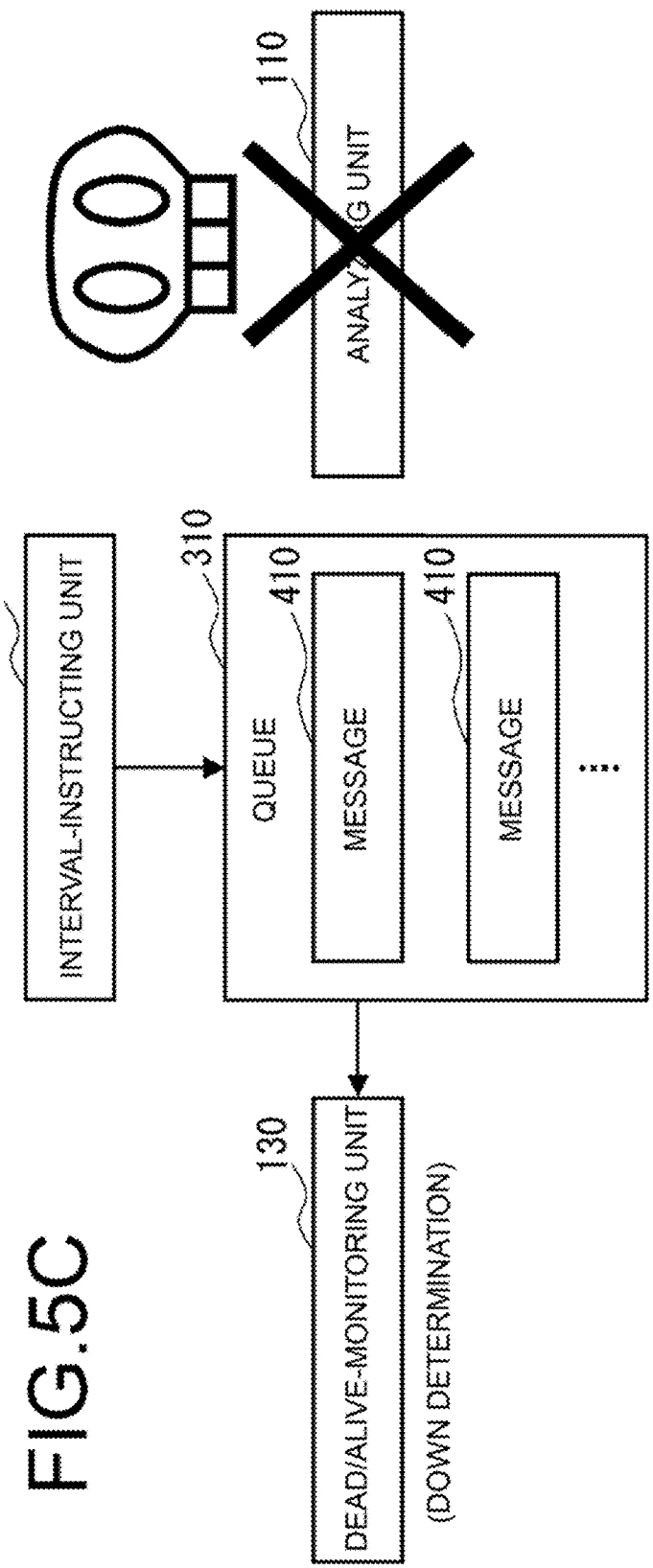

IMAGE FORMING SYSTEM, SERVER, AND IMAGE FORMING METHOD THAT PERFORM DEAD/ALIVE MONITORING OF AT LEAST PART OF SERVERS

INCORPORATION BY REFERENCE

This application is based on and claims the benefit of priority from Japanese Patent Application No. 2017-165752 filed on Aug. 30, 2017, the contents of which are hereby incorporated by reference.

BACKGROUND

The present disclosure relates to an image forming system, a server, and an image forming method, and particularly to an image forming system, a server, and an image forming method that perform dead/alive monitoring of at least part of the servers.

Conventionally, there are image forming apparatuses such as a multifunctional peripheral (MFP) and the like capable of printing text and images.

In addition, there are also image forming systems that include servers that perform maintenance management of these image forming apparatuses. In this image forming system, dead/alive monitoring may be performed for monitoring whether or not the apparatuses, processes and the like are actually active (operating).

Here, as a conventional system that performs dead/alive monitoring, in typical techniques, there is an dead/alive monitoring server technique that monitors whether or not data transmission/reception is being performed for each of the servers included in a server group. In the case where monitoring results are obtained when data transmission and reception are not being performed, a dead/alive-monitoring server transmits dead/alive-monitoring data to a server that obtained the monitoring results via a first network that is used for transmitting and receiving data. Moreover, in the case where there is no response to transmitted dead/alive-monitoring data, the dead/alive-monitoring server notifies a distributing apparatus that distributes and executes arbitrary processing to each of the servers included in a server group about the server, which there is no response.

According to this typical technique, dead/alive monitoring can be executed reliably and quickly.

SUMMARY

The image forming system according to the present disclosure is an image forming system that includes an image forming apparatus and a server for performing management of the image forming apparatus. The image forming apparatus includes an information-transmitting unit that transmits management information to the server. The server includes a management-information-acquiring unit, an analyzing unit, an interval-instructing unit, and a dead/alive-monitoring unit. The management-information-acquiring unit acquires the management information from the image forming apparatus. The analyzing unit analyzes the management information acquired by the management-information-acquiring unit. The interval-instructing unit, at specified time intervals, accumulates an instruction that causes the analyzing unit to indicate an acquisition of the instruction. The dead/alive-monitoring unit counts the number of the instructions of the instructions accumulated by the interval-instructing unit that are not acquired by the analyzing unit, and when the number of the instructions is equal to or greater than a specified threshold value, determines that the analyzing unit is not operating.

The server according to the present disclosure is a server for performing management of an image forming apparatus. The server includes a management-information-acquiring unit, an analyzing unit, an interval-instructing unit, and a dead/alive-monitoring unit. The management-information-acquiring unit acquires the management information from the image forming apparatus. The analyzing unit analyzes the management information acquired by the management-information-acquiring unit. The interval-instructing unit, at specified time intervals, accumulates an instruction that causes the analyzing unit to indicate an acquisition of the instruction. The dead/alive-monitoring unit counts the number of the instructions of the instructions accumulated by the interval-instructing unit that are not acquired by the analyzing unit, and when the number of the instructions is equal to or greater than a specified threshold value, determines that the analyzing unit is not operating.

The image forming method according to the present disclosure is an image forming method that is executed by a server for performing management of an image forming apparatus. The server acquires management information from the image forming apparatus. The server analyzes the acquired management information. The server accumulates, at specified time intervals, an instruction that indicates an acquisition of the instruction. The server counts the number of instructions of the accumulated instructions that are not acquired, and when the number of the instructions is equal to or greater than a specified threshold value, determines not operating.

BRIEF DESCRIPTION OF THE DRAWINGS

FIG. 5C is a concept diagram of the dead/alive monitoring process illustrated in FIG. 4.

DETAILED DESCRIPTION

<Embodiment>
[System Configuration of Image Forming System X]

Figure 1:
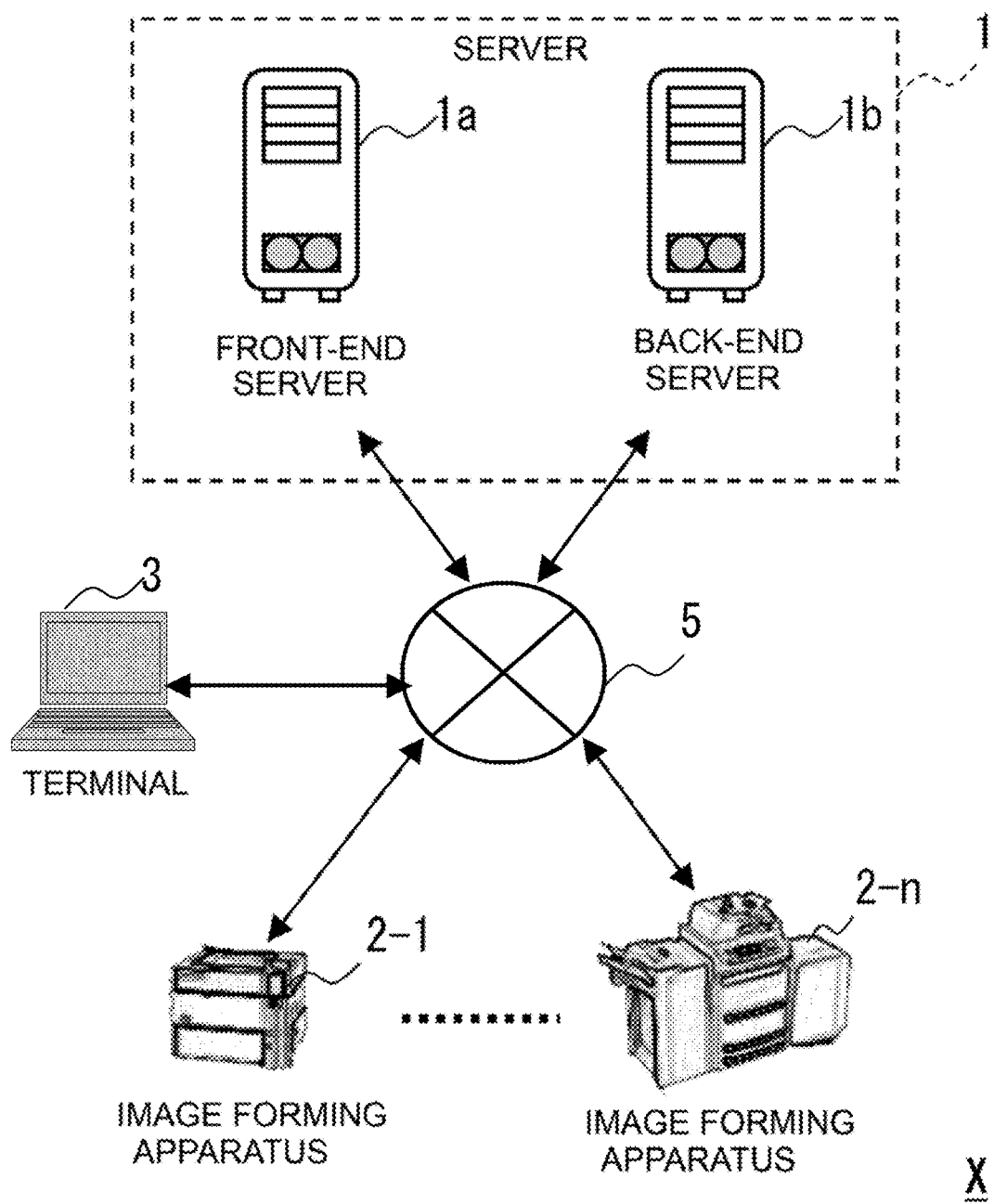
FIG. 1 is a system configuration diagram of an image forming system of an embodiment according to the present disclosure.

First, referring to FIG. 1, the system configuration of an image forming system X of an embodiment according to the present disclosure will be explained.

The image forming system X is configured by connecting image forming apparatuses 2-1, . . . , 2-n, and a terminal 3 via a network 5.

In addition, in the following, when indicating any one of the image forming apparatuses 2-1, . . . , 2-n, the image forming apparatus will simply be referred to as "image forming apparatus 2."

The servers 1 are a server group for remotely performing maintenance processing of the image forming apparatuses 2. The servers 1 may be servers such as a personal computer (PC), general-purpose machine, and the like. These servers 1 remotely manage each of the image forming apparatuses 2, and mainly perform billing, maintenance, and service correspondence. In addition, the servers 1 may be servers on a so-called "cloud." Moreover, the servers 1 may execute image processing, optical character recognition (OCR) processing, classification processing, and transmission processing to an e-mail or shared folder (document box, storage folder), document management system (DMS) for a business or office, and the like. Furthermore, the servers 1 may be capable of executing application software (hereinafter, application software will simply be referred to as an "application").

Incidentally, the servers 1 may be servers in an intranet.

In addition, in this embodiment, the servers 1 that are a group of servers include a front-end server 1a and a back-end server 1b.

Of these, the front-end server 1a is a server that executes "front-end" processing. The front-end server 1a provides a user interface to an administrator who manages via the terminal 3. This is performed by an interface or the like such as the World Wide Web (WWW) based on the HTTP protocol for maintenance monitoring, and the like.

Moreover, the back-end server 1b is a "back-end" server. The back-end server 1b performs batch processing or the like for performing statistics and the like of image forming apparatuses 2 to be monitored. In this embodiment, the back-end server 1b, as will be described later, does not include an interface such as WWW or the like. In addition, the back-end server 1b does not set an IP address or the like such as IPv4 or the like, and may not be able to be accessed by various protocols of TCP/IP (no end point). Therefore, in the case of performing dead/alive monitoring that monitors whether or not the function of the back-end server 1b is actually operating, monitoring does not have to be executed by a ping, which is a simply-specified IP address, a wget of HTTP protocol, or the like.

Incidentally, in the following, in the case of indicating either the front-end server 1a or the back-end server 1b as well, the server will simply be called "server 1".

An image forming apparatus 2 is a document device such as an MFP, a network scanner, a document scanner, a network FAX, a printer with a scanner function and the like that is installed in a customer environment.

In addition, an image forming apparatus 2 may include various functions such as color or monochrome printing, facsimile transmission/reception, network facsimile transmission/reception, copying, electronic documentation by scanning, network scanning, a document box for storing electronic documents, and the like. Moreover, in the case where an image forming apparatus 2 is an MFP, printer or the like having a printing function, the image forming apparatus 2 includes a photosensitive drum, an exposure unit, a developing unit, a transfer unit, a fixing unit, and the like. As a result, by executing an image forming process that includes charging, exposing, developing, transferring, and fixing, the image forming apparatus 2 is able to record and print a toner image on recording paper.

Furthermore, the image forming apparatuses 2 are targets of maintenance management by the image forming system X. Therefore, a dedicated application for maintenance management may be installed. As a result, the image forming apparatuses 2 may transmit management information 400 (refer to FIG. 3) to the servers 1.

The terminal 3 is a terminal for an administrator of the image forming system X. The terminal 3 may be a PC, a smartphone, a personal data assistant (PDA), other dedicated terminal, and the like. The terminal 3, via a WWW browser or the like, performs maintenance of the image forming apparatuses 2 from a management screen or the like that is provided by an interface such as WWW and the like of a front-end server 1a. In addition, the terminal 3 can also be used for viewing analysis results and the like of maintenance management by a back-end server 1b via an interface such as the WWW or the like.

The network 5 is a network such as an intranet such as a local area network (LAN) and the like, a wide area network (WAN) and the like such as the Internet, mobile telephone network, and the like.

The servers 1 and each of the image forming apparatuses 2 may be connected to the network 5 via a router, gateway, or the like. Moreover, the network 5 may be configured by a virtual private network (VPN).

Figure 2:
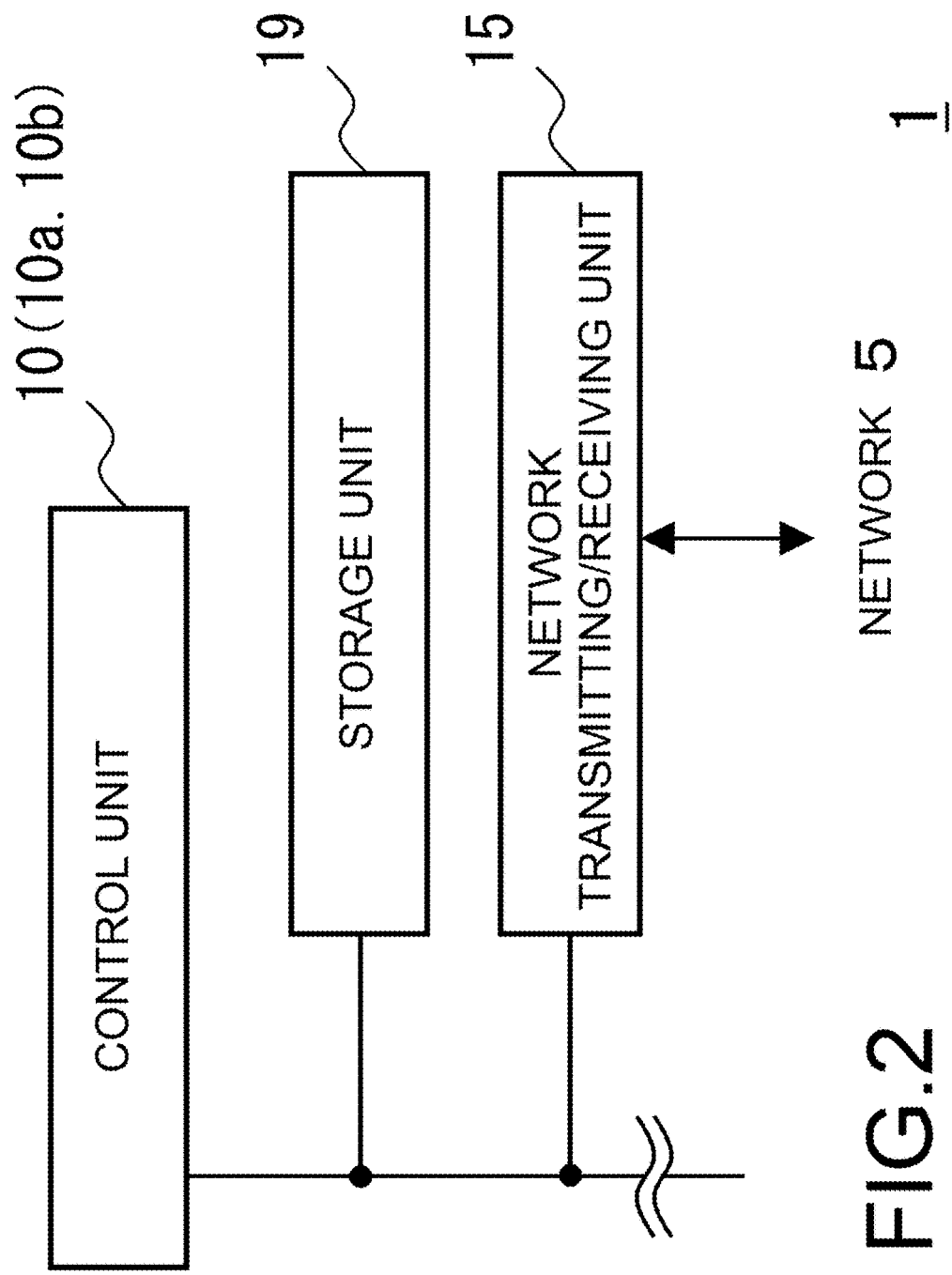
FIG. 2 is a block diagram illustrating a control configuration of a front-end server and a back-end server illustrated in FIG. 1.

Next, the configuration of a server 1 will be explained using FIG. 2.

A server 1 includes a control unit 10, a network transmitting/receiving unit 15, and a storage unit 19.

The control unit 10 is an information processing unit such as a general purpose processor (GPP), a central processing unit (CPU), a micro processing unit (MPU), a digital signal processor (DSP), a graphics processing unit (GPU), an application specific processor (ASIC), or the like.

The control unit 10 operates as each unit of the functional blocks described later by reading a control program that is stored in the ROM, SSD, or HDD of the storage unit 19, and developing and executing the control program in the RAM.

In addition, the control unit 10, as will be described later, may be configured as a control unit 10a (refer to FIG. 3) in a front-end server 1a, and a control unit 10b in a back-end server 1b.

The network transmitting/receiving unit 15 is a network-connecting unit that includes an LAN board, a wireless transceiver or the like for connecting to the network 5.

The storage unit 19 is a storage unit that uses a non-transitory recording medium. The storage unit 19 may include a random access memory (RAM) or the like as a main storage unit. In addition, the storage unit 19 may include a read only memory (ROM), flash memory storage such as an embedded multi media card (eMMC), solid state drive (SDD) and the like, a hard disk drive (HDD), and the like as an auxiliary storage unit. In this case, the auxiliary storage unit of the storage unit 19 may store a control program for performing operation control of the server 1.

In addition, the storage unit 19 may be shared or mutually accessible by the front-end server 1a and the back-end server 1b of the servers 1 via the network 5 or dedicated network. Therefore, the storage unit 19 may be a storage server connected by iSCSI, network attached storage (NAS), or the like. Moreover, only part of the directory (folders) and the like of the storage unit 19 may be shared or mutually accessible by the front-end server 1a and the back-end server 1b, or may be shared or mutually accessible in user units.

Incidentally, the control unit 10 may be internally equipped with a RAM, a ROM, a flash memory, and the like.

[Functional Configuration of Image Forming System X]

Figure 3:
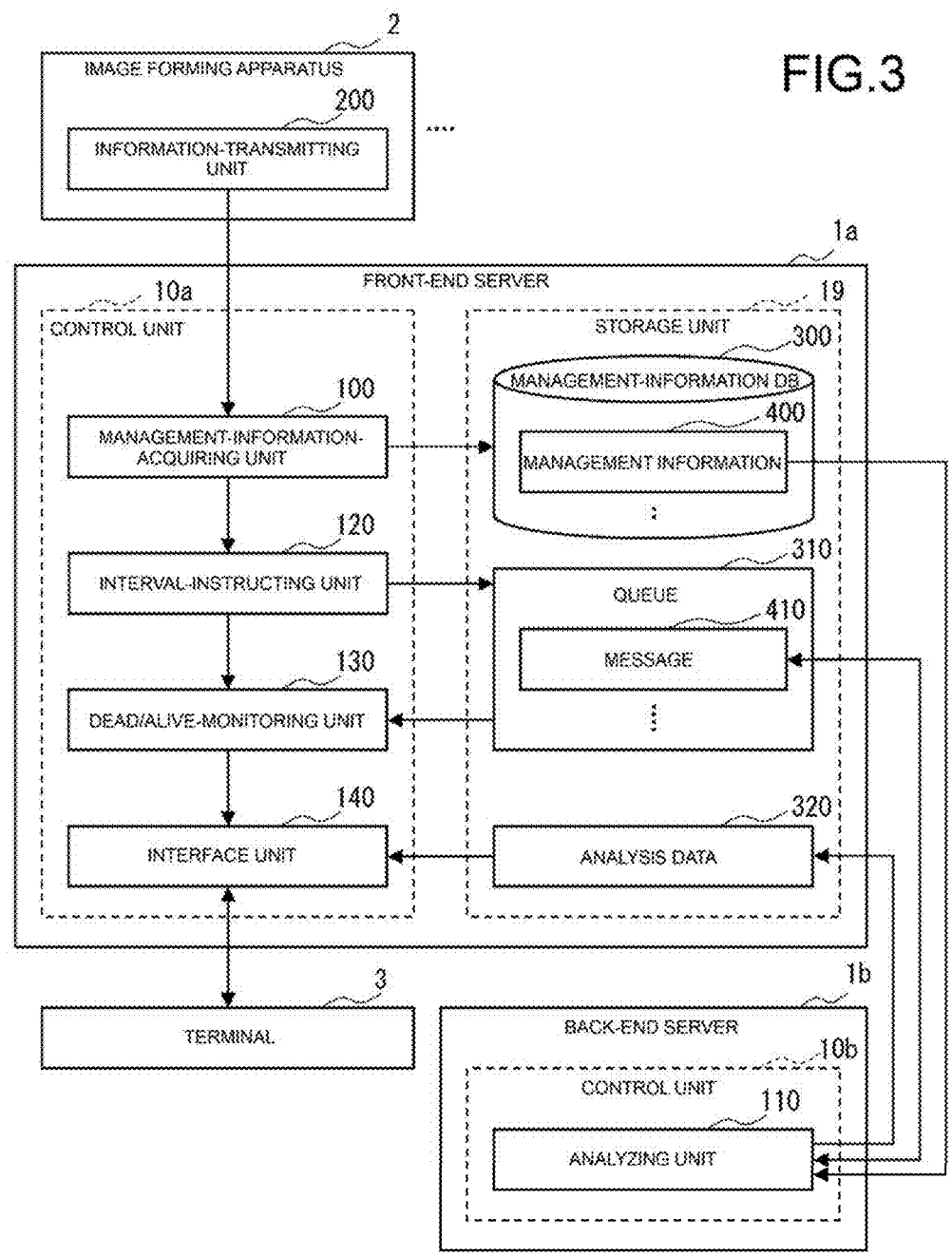
FIG. 3 is a block diagram illustrating a functional configuration of an image forming system of an embodiment according to the present disclosure.

Here, with reference to FIG. 3, the functional configuration of the image forming system X according to an embodiment disclosed in the present disclosure will be explained.

The control unit 10a of the front-end server 1a includes a management-information-acquiring unit 100, an interval-instructing unit 120, a dead/alive-monitoring unit 130, and an interface unit 140.

In addition, the storage unit 19 stores a management-information DB 300, a queue 310, and analysis data 320.

The control unit 10b of the back-end server 1b includes an analyzing unit 110.

Moreover, an image forming apparatus 2 includes an information-transmitting unit 200.

The management-information-acquiring unit 100 acquires management information 400 from the information-transmitting unit 200 of the image forming apparatus 2, and stores the management information 400 in the management-information DB 300.

The analyzing unit 110 analyzes the management information 400 acquired by the management-information-acquiring unit 100. Moreover, the analyzing unit 110 does not have an interface such as WWW or the like, and performs back-end processing. The analyzing unit 110 may, for example, execute this analysis as back-end processing by batch processing at intervals such as several hours to several days or the like. In addition, the analyzing unit 110 may be realized as an instance, a process, a task, a thread, or the like of the control unit 10b. Moreover, the analyzing unit 110 does not set an IP address or end point, and may not be able to access by TCP/IP, HTTP protocol or the like.

Furthermore, when the analyzing unit 110 acquires a message 410 from the queue 310, the analyzing unit 110 discards (deletes or erases) the message 410 without performing any processing. In other words, with the message 410 as a trigger, the analyzing unit 110 does not perform processing such as analysis or the like. However, in this embodiment, when the message 410 itself is discarded and no longer exists, it is possible to indicate to the dead/alive-monitoring unit 130 of "acquisition" that the analyzing unit 110 acquired the message 410.

The interval-instructing unit 120 accumulates instructions that indicate to the analyzing unit 110 at specified time intervals that a message has been acquired. Moreover, in this embodiment, the instruction is a message 410 that is discarded when acquired by the analyzing unit 110. In addition, in this embodiment, the interval-instructing unit 120 accumulates the messages 410 in the queue 310. Therefore, the interval-instructing unit 120 may be set as a task in a cron, a task scheduler, or the like (hereinafter, simply referred to as a "scheduler"), which is a function of the OS or the like. Moreover, as this task, the interval-instructing unit 120 may give an instruction for creating and transmitting a message 410 by a dedicated messenger application, file transfer protocol (FTP), inter-process communication or the like, and accumulating the message 410 in the queue 310. Furthermore, the interval-instructing unit 120 may use time of about a few milliseconds to a few tens of seconds, for example, as the specified time interval; however, using a time of about one second to several seconds is more preferable.

The dead/alive-monitoring unit 130 performs dead/alive monitoring of the analyzing unit 110. The dead/alive-monitoring unit 130 counts the number of instructions of the instructions accumulated by the interval-instruction unit 120 that are not acquired by the analyzing unit 110. In this embodiment, the dead/alive-monitoring unit 130 counts the number of messages 410 accumulated in the queue 310 as the number of instructions. Moreover, the dead/alive-monitoring unit 130 determines that the analyzing unit 110 is not operating (is "dead" or down) when the number of instructions such as messages 410 or the like is equal to or greater than a specified threshold value. For example, two or more instructions within a specified time may set as this specified threshold value, or the like.

Incidentally, in the case where it is determined that the analyzing unit 110 is down, the dead/alive-monitoring unit 130 may notify the terminal 3 with a warning (alert). Moreover, in this case, the dead/alive-monitoring unit 130 may stop analysis, or may distribute analysis to another server that includes an analyzing unit 110.

In addition, the dead/alive-monitoring unit 130 may determine that the analyzing unit 110 is operating (is "alive") when the number of instructions such as messages 410 or the like is less than a specified threshold value. In this case, the dead/alive-monitoring unit 130 may allow transmission of instructions to the analyzing unit 110 with an analysis command.

Furthermore, the dead/alive-monitoring unit 130 may be configured so that in the front-end server 1a execution is not easily stopped from the outside. For example, the dead/alive-monitoring unit 130 may be encapsulated. The dead/alive-monitoring unit 130 may be "jailed". The dead/alive-monitoring unit 130 may be achieved as a processing unit of a virtual server.

Using HTTP protocol, the interface unit 140 may be a WWW server program such as Apache (registered trademark), IIS (registered trademark) or the like that transmits hyper text markup language (HTML) for access from the terminal 3 by WWW, image data, or the like. In addition, the interface unit 140 may be capable of executing a web application (hereinafter, referred to as a "management application") for performing maintenance management of the image forming apparatuses 2 by a common gateway interface (CGI), ASP, PHP, Java (registered trademark) servlet or the like. Moreover, from this management application it may be possible to acquire analysis data in a file having a format that indicates a data string such as ".csv", a tab delimiter or the like, or to browse by graphs and the like.

The information-transmitting unit 200 transmits management information 400 to the front-end server 1a for performing maintenance management.

The management-information DB 300 is a database that stores management information 400. This management-information DB 300 can be referenced from the analyzing unit 110.

The queue 310 is a buffer having a queue 310 format or the like and stores messages 410 that are instructions from the interval-instructing unit 120. The queue 310 may be readable or writable, and may be shared by the interval-instructing unit 120 and the analyzing unit 110.

Incidentally, the queue 310, in addition to messages 410, may also include instructions of various jobs or commands and the like for the back-end server 1b.

The analysis data 320 is data of the results of analyzing the management information 400 by the analyzing unit 110. The analysis data 320, for example, may be data that indicates the operating state, trouble state, maintenance management state, billing state and the like of each image forming apparatus 2.

The management information 400 is record data for maintenance management that is transmitted from the image forming apparatuses 2. The management information 400, for example, may include an ID, an event, the time of occurrence of the event of an image forming apparatus 2 as a log.

A message 410 is data of an instruction that is to be discarded when the message 410 is received by the analyzing unit 110. In this embodiment, a message 410 is a text message 410 or the like for dead/alive monitoring. Moreover, a message 410 may include, for example, a command or the like for the analyzing unit 110 that is to be deleted without anything being done even when acquired by the analyzing unit 110.

Here, by executing a control program stored in the storage unit 19, the control unit 10a of the front-end server 1a is made to function as the management-information-acquiring unit 100, the interval-instructing unit 120, the dead/alive-monitoring unit 130, and the interface unit 140.

In addition, by executing a control program stored in the storage unit, the control unit 10b of the back-end server 1b is made to function as an analyzing unit 110.

Moreover, each of the units of the server 1 and image forming apparatus 2 described above are hardware resources that execute the image forming method according to the present disclosure.

Furthermore, part or an arbitrary combination of the functional configuration described above may be configured in a hardware-like manner using IC, programmable logic, or the like.

[Dead/Alive-Monitoring Process by Image Forming System X]

Figure 4:
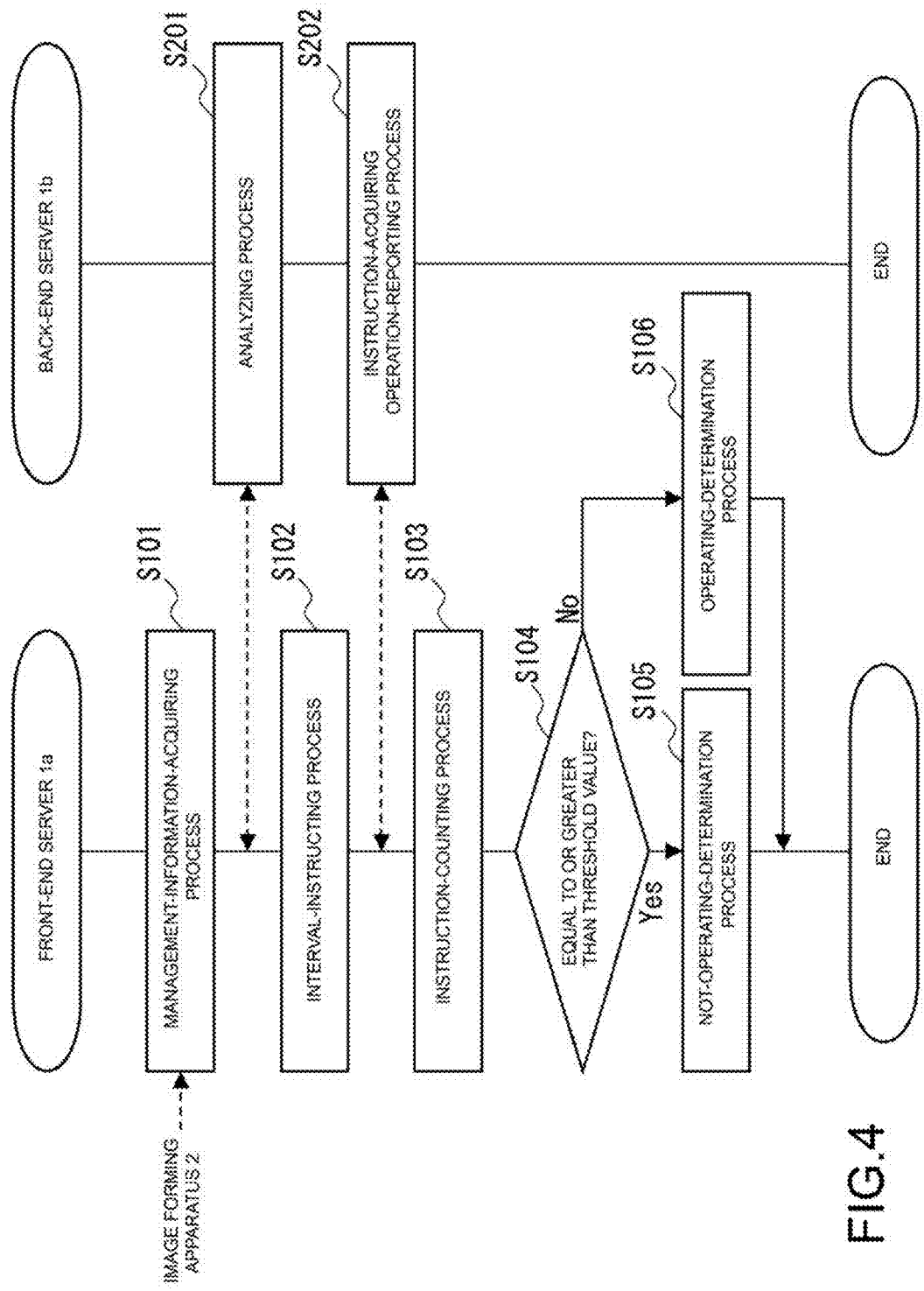
FIG. 4 is a flowchart of a dead/alive monitoring process of an embodiment according to the present disclosure.

Next, the dead/alive-monitoring process by the image forming system X according to an embodiment disclosed in the present disclosure will be explained with reference to FIG. 4 to FIG. 5C.

In the dead/alive-monitoring process of this embodiment, mainly the servers 1 acquire management information 400 from the image forming apparatuses 2. In addition, the acquired management information 400 is analyzed. Then, at specified time intervals, messages 410 that are to be discarded when acquired are accumulated in the queue 310. Then, of the accumulated messages 410, the number of messages 410 that are not acquired are counted. When doing this, in the case where the number of instructions within a specified time or more is two or more, it is determined that there is no activity.

The dead/alive-monitoring process of this embodiment is a process in which mainly the control unit 10a of the front-end server 1a executes a program stored in the storage unit 19, and the control unit 10b of the back-end server 1b executes a control program stored in the storage unit in cooperation with each unit and using hardware resources.

In the following, each step of the process will be explained in detail with reference to the flowchart in FIG. 4.

(Step S101)

First, the management-information-acquiring unit 100 of the front-end server 1a performs a management-information-acquiring process.

Here, first, when an event or the like occurs, the information-transmitting unit 200 of the image forming apparatus generates management information 400, and transmits the information to the front-end server 1a via the network 5.

The management-information-acquiring unit 100, acquires this management information 400, and then stores the information in the management-information DB 300. When doing this, the management-information-acquiring unit 100 may, in accordance to the type of log or the like, classify and store the management information 400 so that statistical processing is easy.

(Step S201)

Next, the analyzing unit 110 of the back-end server 1b performs an analysis process.

The analyzing unit 110 accesses the management-information DB 300 of the storage unit 19 of the front-end server 1a, and analyzes the management information 400. The analyzing unit 110 executes a statistical process or the like from the accumulated management information 400 as a batch process or the like. The time of the batch process or the like may be set by a scheduler. The batch process or the like may be triggered when the volume of management information 400 accumulated in the management-information DB 300 reaches a specified value or greater. The analyzing unit 110 stores the analysis results in the storage unit 19 of the front-end server 1a as analysis data 320.

Incidentally, The analyzing unit 110 may start the batch process or the like according to an instruction such as a command or the like to start the batch process to the queue 310 by the control unit 10a of the front-end server 1a.

(Step S102)

Next, the interval-instructing unit 120 of the front-end server 1a performs an interval-instructing process.

The interval-instructing unit 120, at specified time intervals, accumulates an instruction that indicate an acquisition of the instruction. In this embodiment, the analyzing unit 110 is the target of dead/alive monitoring, so the interval-instructing unit 120 accumulates instructions for the analyzing unit 110 in the queue 310.

Figure 5A:
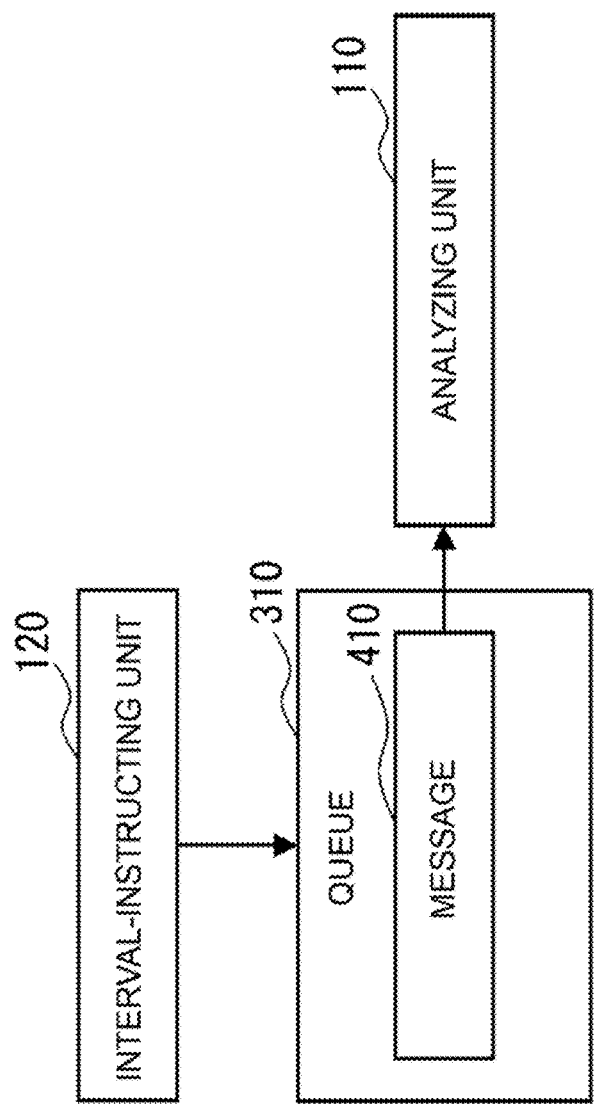
FIG. 5A is a concept diagram of the dead/alive monitoring process illustrated in FIG. 4.

According to FIG. 5A, the interval-instructing unit 120, as a scheduler, at specified time intervals, accumulates messages 410 for the analyzing unit 110 in the queue 310. The analyzing unit 110, as will be described below, acquires the messages 410.

(Step S202)

Next, the analyzing unit 110 of the back-end user 1b performs an instruction-acquiring operation-reporting process.

Figure 5B:
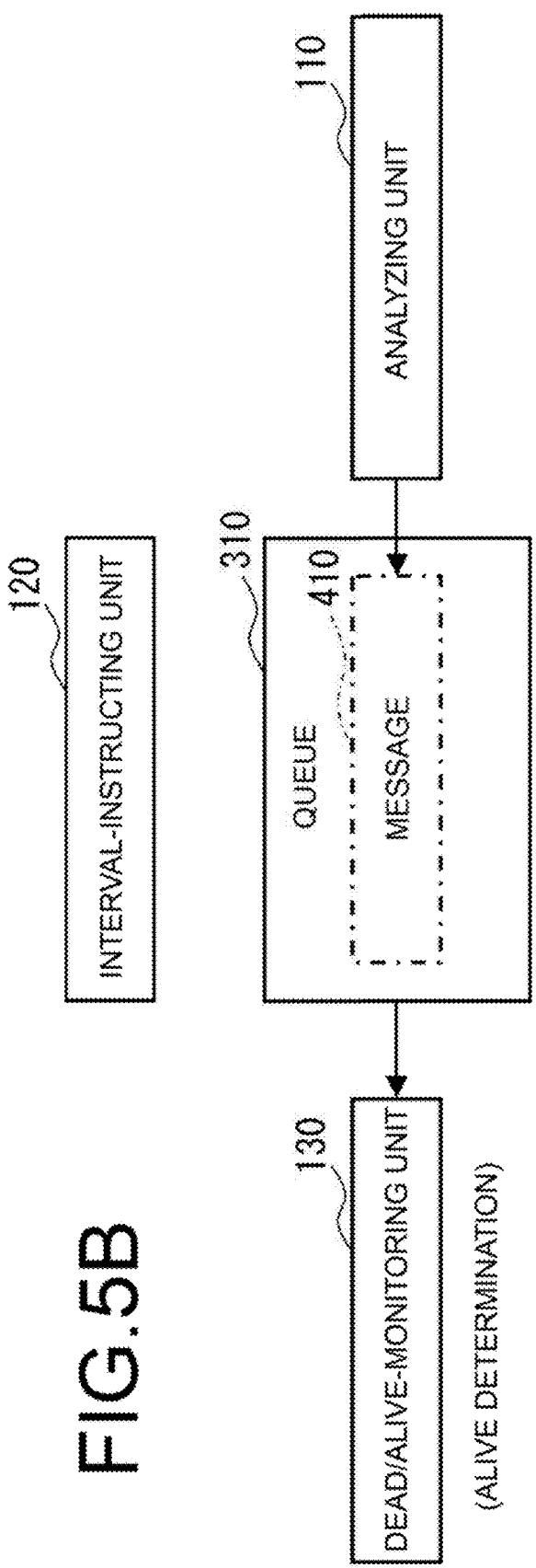
FIG. 5B is a concept diagram of the dead/alive monitoring process illustrated in FIG. 4.

According to FIG. 5B, the analyzing unit 110 references the queue 310 at specified time intervals, and after acquiring a message 410, discards the message 410. The analyzing unit 110 does not particularly perform a process such as analysis or the like using this message 410 as a trigger. By discarding accumulated messages 410 in this way, the analyzing unit 110 is able to indirectly indicate to the dead/alive-monitoring unit 130 that the message 410 is acquired. In other words, in this embodiment, the analyzing unit 110 is able to indicate that the analyzing unit 110 is operating (alive).

(Step S103)

Next, the dead/alive-monitoring unit 130 performs an instruction-counting process.

According to FIG. 5C, in the case where the server that is being monitored is down for some reason, and the process for acquiring the messages 410 cannot be performed, messages 410 accumulate in the queue 310.

Therefore, in this embodiment, of the instructions accumulated by the interval-instructing unit 120, the dead/alive-monitoring unit 130 counts the number of messages 410 that are instructions that are not acquired by the analyzing unit 110. In this embodiment, the dead/alive-monitoring unit 130, for example, at specified time intervals, counts the number of messages 410 that are accumulated as is in the queue 310.

Incidentally, the dead/alive-monitoring unit 130 may count the number of messages 410 at time intervals that are several milliseconds to several seconds longer than the specified time interval.

(Step S104)

Next, the dead/alive-monitoring unit 130 determines whether or not the number is equal to or greater than a threshold value. The dead/alive-monitoring unit 130 determines YES when the number of instructions is equal to or greater than a specified threshold value. In the example in FIG. 5C, the dead/alive-monitoring unit 130 determines YES in the case where two or more messages 410 are accumulated in the queue 310 within a specified time. The dead/alive-monitoring unit 130 determines NO in other cases.

In the case where the determination is YES, the dead/alive-monitoring unit 130 advances processing to step S105.

In the case where the determination is NO, the dead/alive-monitoring unit 130 advances processing to step S106.

(Step S105)

In the case where the accumulated number of messages 410 is equal to or greater than a threshold value, the dead/alive-monitoring unit 130 performs a not-operating-determination process.

The dead/alive-monitoring unit 130 notifies the terminal 3 with an alert that the analyzing unit 110 is presumed to be down. The dead/alive-monitoring 130 may perform this notification by using e-mail, chat, messenger, or the like. Moreover, the dead/alive-monitoring unit 130 may directly transmit an alert notification to an administrator by SMS, Chat or the like. An administrator who receives this alert may determine the cause for the analyzing unit 110 being down, and restore the analyzing unit 110 from the terminal 3 by restarting the back-end server 1b or the like.

Moreover, the dead/alive-monitoring unit 130 may stop analysis by the analyzing unit 110, or distribute analysis to other servers that include an analyzing unit 110.

After that, the dead/alive-monitoring unit 130 ends the dead/alive-monitoring process according to this embodiment.

(Step S106)

In the case where the number of accumulated messages 410 is not equal to or greater than a threshold value, the dead/alive-monitoring unit 130 performs an operating-determination process.

In addition, the dead/alive-monitoring unit 13, presuming that the analyzing unit 110 is alive, may allow transmission of an instruction to the analyzing unit 110 with an analysis command. In this case, the dead/alive-monitoring unit 130 may set the time of a batch process, and transmit a batch process command to the queue 310.

With this, the dead/alive-monitoring process according to an embodiment disclosed in the present disclosure ends.

With the configuration described above, the following advantages can be obtained.

Conventionally, with the typical techniques described above, in order to perform dead/alive monitoring, it is necessary to have separate apparatuses such as a distributing apparatus.

However, the image forming system X according to an embodiment as disclosed in the present disclosure is an image forming system that includes an image forming apparatus 2, and servers 1a, 1b for managing the image forming apparatuses 2. The image forming apparatus 2 includes an information-transmitting unit 200 that transmits management information 400 to the servers. In addition, the server 1a includes a management-information-acquiring unit 100, an interval-instructing unit 120, and a dead/alive-monitoring unit 130. The server 1b includes an analyzing unit 110. The management-information-acquiring unit 100 acquires management information 400 from the image forming apparatus 2. The analyzing unit 110 analyzes the management information 400 acquired by the management-information-acquiring unit 100. The interval-instructing unit 120, at specified time intervals, accumulates an instruction that causes the analyzing unit 110 to indicate an acquisition of the instruction. The dead/alive-monitoring unit 130 counts the number of instructions of the instructions accumulated by the interval-instructing unit 120 that are not acquired by the analyzing unit 110, and when that number of instructions is equal to or greater than a specified threshold value, determines that the analyzing unit 110 is not operating.

With this kind of configuration, dead/alive monitoring of the analyzing unit 110 can be performed easily without a separate apparatus such as a distributing apparatus.

Moreover, in the past there has been a method of installing an agent for monitoring servers and the like that perform back-end processing, and periodically performing dead/alive monitoring of the server state using that agent.

In this kind of method, it is necessary to install a separate agent in a server or the like that performs back-end processing, and in the case of an environment in which an agent cannot be installed, it is not possible to perform dead/alive monitoring. In addition, by performing dead/alive monitoring using this kind of agent, many resources such as processing time, storage capacity of the server and the like are consumed.

However, with the image forming system X according to the embodiment as disclosed in the present disclosure it is possible to achieve dead/alive monitoring of an analyzing unit 110 without separately installing an agent in the back-end server 1b or the like. Moreover, for example, it is possible to achieve dead/alive monitoring by simply setting a task or the like by a scheduler as the interval-instructing unit 120, and accumulate instructions.

Furthermore, conventionally, performing dead/alive monitoring by monitoring whether on not accumulation of data such as analysis data 320 is being performed has been considered.

However, whether or not data is being accumulated in this way cannot be determined accurately while an analysis file or the like is open and being written to. Moreover, it is not possible to know in real-time (instantaneously) when the analyzing unit 110 stops.

However, a feature of the image forming system X according to an embodiment as disclosed in the present disclosure, is that instructions are messages 410 that are discarded when acquired by the analyzing unit 110, and the dead/alive-monitoring unit 130 counts the number of messages 410 as the number of instructions.

With this kind of configuration, in the case where messages 410 are accumulated in the queue 310 that is referenced in common by both the analyzing unit 110 that is the target of monitoring and the dead/alive-monitoring unit 110, and the number of messages 410 in the queue 310 has reached a specified threshold value or greater, the dead/alive-monitoring unit 130 determines that due to some kind of trouble, the analyzing unit 110 that is the target of monitoring is down. As a result, it is possible to easily achieve dead/alive monitoring by simply counting the number of messages 410.

Furthermore, as a conventional method for performing dead/alive monitoring of servers, there is a method in which a ping is transmitted at set intervals to an apparatus that is connected by a network that can be accessed by HTTP protocol and the like and includes an end point, and whether or not a server is alive is determined by a wget or the like. However, with this kind of method, it is only possible to monitor apparatuses that are accessible with TCP/IP and HTTP protocol.

On the other hand, a feature of the image forming apparatus according to an embodiment as disclosed in the present disclosure is that the analyzing unit 110 performs back-end processing that does not include a web interface such as WWW or the like.

With this kind of configuration, it is possible to easily perform dead/alive monitoring of the analyzing unit 110 as well. For example, the analyzing unit 110 may also not have an end point. The analyzing unit 110 in some cases may not have a web interface. The analyzing unit 110 may block a ping and not be able to respond. The analyzing unit 110 may not be able to perform dead/alive monitoring by wget or the like.

[Other Embodiments]

Incidentally, in the embodiment described above, an example is described in which messages 410 are accumulated as an "instruction that indicates an acquisition of the instruction."

However, the analyzing unit 110 may also process a message 410, or the like, by using a method that writes or changes data itself, or some other method to be recognizable, such as a time stamp for acquiring (reference) or the like, and it may also indicate "acquisition".

Moreover, instead of a message 410, e-mail, chat data, a file with a specified name, a lock file, stack data, a bit string, a flag, or the like (hereinafter, these will be referred to as "mail, or the like") may be used as an instruction for indicating that an instruction has been acquired by the analyzing unit 110.

In the case of using mail or the like in this way, the analyzing unit 110 may discard the mail or the like in a manner similar to that of a message 410. Moreover, in the case of using the above-described mail or the like, the dead/alive-monitoring unit 130 may count the number of the mail or the like.

Furthermore, in the case of using another method as a method for indicating "acquisition" that an instruction is acquired, the analyzing unit 110 may process the message 410, mail, or the like by the other method. In this case, the dead/alive-monitoring unit 130 may count the number indicated by the other method for each instruction.

With this kind of configuration, it is possible to perform dead/alive monitoring of servers using flexible configuration even in an environment in which messages 410 cannot be accumulated.

In addition, of the servers 1 according to the embodiments described above, the configuration of using a front-end server 1a and a back-end server 1b is an example. In other words, of the servers 1, configuration may be of an arbitrary group of servers. For example, the front-end server 1a and the back-end surface 1b of the servers 1 may be a single server, or may be configured so as to be distinguished by a virtual machine in a server, a logical or physical CPU, or the like. Moreover, servers other than a front-end server 1a and back-end server 1b can be provided, and the number of a plurality of servers may vary according to whether processing is light or heavy. Furthermore, the front-end server 1a and the back-end server 1b may be connected by a dedicated high-speed network. In addition, respective dedicated servers may be prepared for functional units such as for scheduling, dead/alive monitoring, a database, and the like. Moreover, dead/alive monitoring may be performed for other servers instead of the analyzing unit 110 of the back-end server 1b.

Furthermore, each of the functional units described above may also be included in any one of the front-end server 1a and back-end server 1b, and there may be included a plurality of units, or part of the functional units may be omitted.

In a typical technique described above, a separate apparatus such as a distributing apparatus is necessary for dead/alive monitoring.

With the present invention, at specified time intervals, an instruction, which indicates an acquisition of the instruction when acquired, is accumulated, and the number of instructions that are not acquired are counted, and the analyzing unit is determined to not be operating. As a result, an image forming system can be provided that is capable of performing dead/alive monitoring without the need to add separate apparatuses.

Moreover, the technique according to the present disclosure can also be applied to the management of information-processing apparatuses other than image forming apparatuses. For example, configuration is possible in which servers or the like are used that separately connect network scanners and scanners using a USB or the like.

Furthermore, the configuration and operation in the above-described embodiments are examples, and needless to say can be appropriately modified and executed within a scope that does not depart from the technique disclosed in the present disclosure.

What is claimed is:

1. An image forming system that includes an image forming apparatus and a server for performing management of the image forming apparatus; wherein
the image forming apparatus comprises:
an information-transmitting unit that transmits management information to the server;
the server comprises:
a management-information-acquiring unit that acquires the management information from the image forming apparatus;
an analyzing unit that analyzes the management information acquired by the management-information-acquiring unit;
an interval-instructing unit that, at specified time intervals, accumulates an instruction that causes the analyzing unit to indicate an acquisition of the instruction; and
a dead/alive-monitoring unit that counts the number of the instructions of the instructions accumulated by the interval-instructing unit that are not acquired by the analyzing unit, and when the number of the instructions is equal to or greater than a specified threshold value, determines that the analyzing unit is not operating;
the instructions are messages that are discarded when acquired by the analyzing unit; and
the dead/alive-monitoring unit counts the number of messages as the number of instructions.

2. The image forming system according to claim 1, wherein
the analyzing unit performs back-end processing that does not include a web interface.

3. A server for performing management of an image forming apparatus, comprising:
a management-information-acquiring unit that acquires management information from the image forming apparatus;
an analyzing unit that analyzes the management information acquired by the management-information-acquiring unit;
an interval-instructing unit that, at specified time intervals, accumulates an instruction that causes the analyzing unit to indicate an acquisition of the instruction; and a dead/alive-monitoring unit that counts the number of the instructions of the instructions accumulated by the interval-instructing unit that are not acquired by the analyzing unit, and when the number of the instructions is equal to or greater than a specified threshold value, determines that the analyzing unit is not operating;

wherein the instructions are messages that are discarded when acquired by the analyzing unit; and the dead/alive-monitoring unit counts the number of messages as the number of instructions.

4. An image forming method that is executed by a server for performing management of an image forming apparatus, whereby the server acquires management information from the image forming apparatus;

analyzes the acquired management information;

accumulates, at specified time intervals, an instruction that indicates an acquisition of the instruction; and counts the number of instructions of the accumulated instructions that are not acquired, and when the number of the instructions is equal to or greater than a specified threshold value, determines not operating;

wherein the instructions are messages that are discarded when acquired; and the dead/alive-monitoring unit counts the number of messages as the number of instructions.

* * * * *